United States Patent
Meguro et al.

(10) Patent No.: US 10,906,523 B2
(45) Date of Patent: Feb. 2, 2021

(54) CONTROL APPARATUS AND CONTROL METHOD FOR HYBRID VEHICLE

(71) Applicants: SHINDENGEN ELECTRIC MANUFACTURING CO., LTD., Tokyo (JP); HONDA MOTOR CO., LTD., Tokyo (JP)

(72) Inventors: Takayuki Meguro, Saitama (JP); Mitsuhiro Kimura, Saitama (JP); Ryuichi Takao, Saitama (JP); Isao Shokaku, Saitama (JP)

(73) Assignees: Shindengen Electric Manufacturing Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 16/093,788

(22) PCT Filed: Sep. 9, 2016

(86) PCT No.: PCT/JP2016/076714
§ 371 (c)(1),
(2) Date: Oct. 15, 2018

(87) PCT Pub. No.: WO2018/016086
PCT Pub. Date: Jan. 25, 2018

(65) Prior Publication Data
US 2020/0180593 A1    Jun. 11, 2020

(30) Foreign Application Priority Data

Jul. 22, 2016   (JP) .................................. 2016-144378

(51) Int. Cl.
*B60W 20/00* (2016.01)
*B60K 6/26* (2007.10)
(Continued)

(52) U.S. Cl.
CPC ............... *B60W 20/00* (2013.01); *B60K 6/26* (2013.01); *B60K 6/485* (2013.01); *B60W 50/038* (2013.01); *B60Y 2200/92* (2013.01)

(58) Field of Classification Search
CPC ....... B60W 20/00; B60W 50/038; B60K 6/26; B60K 6/485; B60Y 2200/92
(Continued)

(56) References Cited

U.S. PATENT DOCUMENTS 5,789,823 A * 8/1998 Sherman ................. F16H 61/62
                                                    290/47
5,905,346 A * 5/1999 Yamada .................... B60K 6/26
                                                    318/50
(Continued)

FOREIGN PATENT DOCUMENTS

DE    10 2006 012384 A1    9/2007
JP    2000-103384 A        4/2000
(Continued)

OTHER PUBLICATIONS

Office Action dated Nov. 27, 2019 for related IN Patent Application No. 201717046891, in 7 pages.
(Continued)

*Primary Examiner* — Gertrude Arthur Jeanglaude
(74) *Attorney, Agent, or Firm* — Procopio, Cory, Hargreaves & Savitch LLP

(57) ABSTRACT

A controlling apparatus 1 according to an embodiment is a controlling apparatus of a hybrid vehicle 30 including a motor generator 3 that is mechanically connected to an internal combustion engine 2 and that can generate power in response to rotation of the internal combustion engine 2 and provide torque to the internal combustion engine 2, the controlling apparatus 1 including a rotation information acquiring unit 11 that acquires rotation information of the
(Continued)

motor generator 3 with a higher resolution than rotation information of the internal combustion engine 2 and a power generation determining unit 12 that makes a determination regarding the power generation by the motor generator 3 based on the rotation information of the motor generator 3.

10 Claims, 5 Drawing Sheets

(51) Int. Cl.
*B60K 6/485* (2007.10)
*B60W 50/038* (2012.01)

(58) Field of Classification Search
USPC .......................................................... 701/22
See application file for complete search history.

(56) References Cited

U.S. PATENT DOCUMENTS

| | | |
|---|---|---|
| 6,424,053 B1 | 7/2002 | Wakashiro |
| 8,989,938 B2 | 3/2015 | Ando |
| 2001/0020789 A1* | 9/2001 | Nakashima ............ B60K 6/387 |
| | | 290/400 |
| 2004/0174018 A1 | 9/2004 | Itoh |
| 2005/0211481 A1* | 9/2005 | Sasamoto ................ B60K 6/44 |
| | | 180/65.225 |
| 2012/0245779 A1 | 9/2012 | Goto et al. |

FOREIGN PATENT DOCUMENTS

| | | |
|---|---|---|
| JP | 2000-205002 A | 7/2000 |
| JP | 2001-107765 A | 4/2001 |
| JP | 2005-006469 A | 1/2005 |
| JP | 2011-125210 A | 6/2011 |
| JP | 2013-249032 A | 12/2013 |

OTHER PUBLICATIONS

International Search Report for corresponding application No. PCT/JP2016/076714, dated Nov. 29, 2016, in 2 pages.
Extended European Search Report for related EP Patent Application No. 16909561.9, dated Aug. 16, 2019, in 10 pages.
Office Action dated Jun. 2, 2020 for related European Patent Application No. 16909561.9, in 5 pages.

* cited by examiner

CONTROL APPARATUS AND CONTROL METHOD FOR HYBRID VEHICLE

TECHNICAL FIELD

The present invention relates to a controlling apparatus and a controlling method of a hybrid vehicle.

BACKGROUND ART

There is a conventionally known hybrid vehicle including an internal combustion engine (engine) and an electric motor (motor) as power sources. In the hybrid vehicle, the electric motor is provided as a motor generator in some cases. The motor generator can provide torque to the internal combustion engine to assist the internal combustion engine and can also generate power during running based on the internal combustion engine.

Furthermore, a vehicle such as a two-wheeled vehicle is conventionally provided with an alternating current generator (Alternating Current Generator: ACG) that is connected to a crankshaft of an internal combustion engine and that generates power in response to rotation of the internal combustion engine. Alternating current power generated by the alternating current generator is converted by a regulator rectifier (REG/RECT) into direct current power corresponding to a battery and then supplied to the battery.

In Patent Literature 1, a charge and discharge controlling apparatus is described, the apparatus being configured to restrict a charging current by using an upper limit as an upper limit current value, the upper limit corresponding to an integrated value of the charging current.

CITATION LIST

Patent Literature

Patent Literature 1: Japanese Patent Laid-Open No. 2011-125210

SUMMARY OF INVENTION

Technical Problem

By the way, in the hybrid vehicle, the alternating current generator can be provided as a motor generator that functions not only as a generator, but also as an electric motor capable of providing torque to the internal combustion engine.

When the motor generator (alternating current generator) uses rotational driving force of the internal combustion engine to generate power, a rotational speed of the internal combustion engine is used to figure out a rotational speed of the internal combustion engine. The rotational speed is calculated every time the crankshaft rotates 180°. One magnet of an N pole and one magnet of an S pole are provided on a peripheral surface of the crankshaft, and the rotational speed is calculated based on a pulse signal detected by a Hall element arranged near the crankshaft. In the present application, the thus calculated rotational speed will be referred to as an "engine rotational speed".

Since a resolution of the engine rotational speed is low, a long time is required to confirm the rotational speed of the internal combustion engine, and there is a problem that a time lag is generated. More specifically, there is conventionally a problem that it is difficult to promptly make a determination regarding the power generation.

Therefore, an object of the present invention is to provide a controlling apparatus and a controlling method of a hybrid vehicle that can promptly make a determination regarding power generation of a hybrid vehicle.

Solution to Problem

A controlling apparatus according to the present invention is a controlling apparatus of a hybrid vehicle including a motor generator that is mechanically connected to an internal combustion engine and that can generate power in response to rotation of the internal combustion engine and provide torque to the internal combustion engine, the controlling apparatus including:

a rotation information acquiring unit that acquires rotation information of the motor generator with a higher resolution than rotation information of the internal combustion engine; and a power generation determining unit that makes a determination regarding the power generation by the motor generator based on the rotation information of the motor generator.

Furthermore, in the controlling apparatus, the power generation determining unit may permit idle power generation by the motor generator when starting of the internal combustion engine is completed and a starting completion reference time has passed.

Furthermore, in the controlling apparatus, the power generation determining unit may cancel the permission of the idle power generation when the motor generator is in an abnormal state or when brake control is performed.

Furthermore, in the controlling apparatus, the power generation determining unit may accept the idle power generation by the motor generator when the starting of the internal combustion engine is not completed and a rotational speed of the motor generator is equal to or greater than a power generation possible reference rotational speed.

Furthermore, in the controlling apparatus, the power generation determining unit may not permit the idle power generation by the motor generator when the starting of the internal combustion engine is not completed and the rotational speed of the motor generator is smaller than the power generation possible reference rotational speed.

Furthermore, in the controlling apparatus, the power generation determining unit may permit cruise power generation by the motor generator when the rotational speed of the motor generator is equal to or greater than a high rotation reference rotational speed.

Furthermore, in the controlling apparatus, the power generation determining unit may cancel the permission of the cruise power generation when the motor generator is in an abnormal state or when brake control is performed.

Furthermore, in the controlling apparatus, when the cruise power generation is currently performed, the power generation determining unit may continue the cruise power generation even if the rotational speed of the motor generator is smaller than the high rotation reference rotational speed as long as the rotational speed of the motor generator is equal to or greater than a second high rotation reference rotational speed lower than the high rotation reference rotational speed.

Furthermore, in the controlling apparatus, the motor generator may cause the internal combustion engine to start to rotate when the hybrid vehicle departs.

Furthermore, in the controlling apparatus, the hybrid vehicle may be a hybrid two-wheeled vehicle.

A controlling method of a hybrid vehicle according to the present invention is a controlling method of a hybrid vehicle including a motor generator that is mechanically connected to an internal combustion engine and that can generate power in response to rotation of the internal combustion engine and provide torque to the internal combustion engine, the controlling method including:

acquiring, by a rotation information acquiring unit, rotation information of the motor generator with a higher resolution than rotation information of the internal combustion engine; and making a determination, by a power generation determining unit, regarding the power generation by the motor generator based on the rotation information of the motor generator.

Advantageous Effect of Invention

In the present invention, the rotation information of the motor generator with a higher resolution than the rotation information of the internal combustion engine is acquired, and the determination regarding the power generation is made based on the rotation information of the motor generator. As a result, according to the present invention, the determination regarding the power generation of the hybrid vehicle can be promptly made.

DESCRIPTION OF EMBODIMENT

Hereinafter, an embodiment of the present invention will be described with reference to the drawings.

First, a schematic configuration of a hybrid vehicle 30 according to the embodiment will be described with reference to FIGS. 1 to 3.

The hybrid vehicle 30 is a hybrid-type two-wheeled vehicle (hybrid two-wheeled vehicle) including two power sources which are an internal combustion engine and an electric motor. Note that the hybrid vehicle 30 is not limited to the two-wheeled vehicle and may be another hybrid-type vehicle (such as a four-wheeled vehicle).

Figure 1:
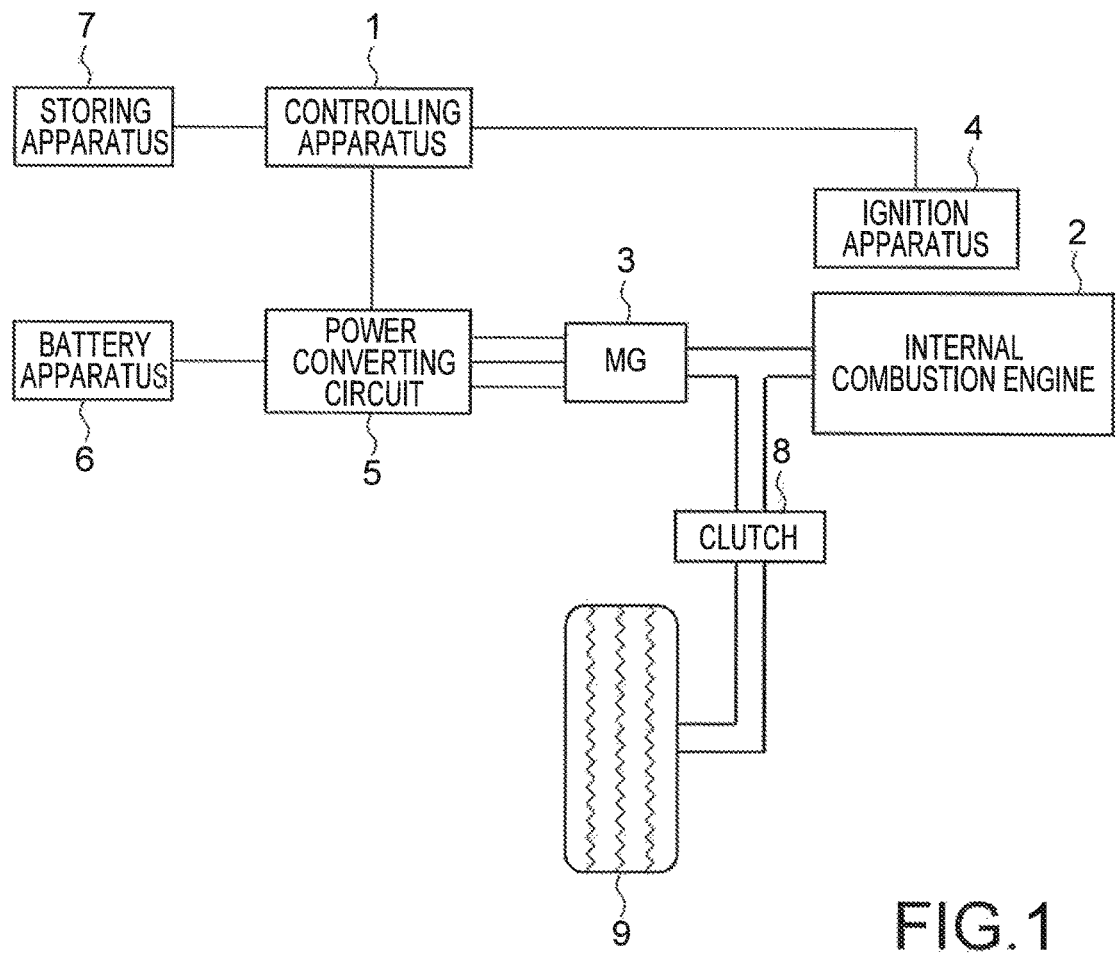
FIG. 1 is a diagram showing a schematic configuration of a hybrid vehicle 30 according to an embodiment.

As shown in FIG. 1, the hybrid vehicle 30 includes a controlling apparatus 1, an internal combustion engine (engine) 2, a motor generator (Motor Generator: MG) 3, an ignition apparatus 4, a power converting circuit 5, a battery apparatus 6, a storing apparatus 7, a clutch 8, and a wheel 9. The wheel 9 of FIG. 1 represents a rear wheel of the hybrid two-wheeled vehicle.

The controlling apparatus 1 is configured to make a determination regarding power generation by the motor generator 3. The power generation includes idle power generation and cruise power generation (power generation during running). The idle power generation is performed when the internal combustion engine 2 is in an idle state (idling state), that is, when the internal combustion engine 2 is rotating at a relatively low speed. On the other hand, the cruise power generation is performed when the hybrid vehicle 30 is running, that is, when the internal combustion engine 2 is rotating at a higher speed than in the idle state. Details of the controlling apparatus 1 will be described later. Note that the controlling apparatus 1 may be provided as an ECU (Electronic Control Unit) that controls the entire hybrid vehicle 30.

The internal combustion engine 2 uses pressure when a fuel gas (air-fuel mixture) is burned and outputs rotational driving force to the wheel 9 through the clutch 8. A crankshaft 21 of the internal combustion engine 2 changes up-and-down motion of pistons (not shown) into rotary motion.

Note that the type of the internal combustion engine 2 is not particularly limited, and for example, the internal combustion engine 2 may be a 4-stroke engine or a 2-stroke engine. Furthermore, an electronic throttle valve (not shown) may be disposed on an intake path of the internal combustion engine 2. In this case, an accelerator position sensor reads a throttle opening set by an accelerator (grip) operation of a driver (rider) and transmits the throttle opening as an electrical signal to the controlling apparatus 1. Subsequently, the controlling apparatus 1 calculates a throttle opening based on the received set throttle opening and transmits a command to adjusting means (such as a throttle motor) of the throttle opening.

The motor generator 3 is mechanically connected to the internal combustion engine 2 as shown in FIG. 1. In the present embodiment, the motor generator 3 is based on an alternating current generator (ACG) and is connected to the crankshaft of the internal combustion engine 2 all the time without a clutch.

Figure 2:
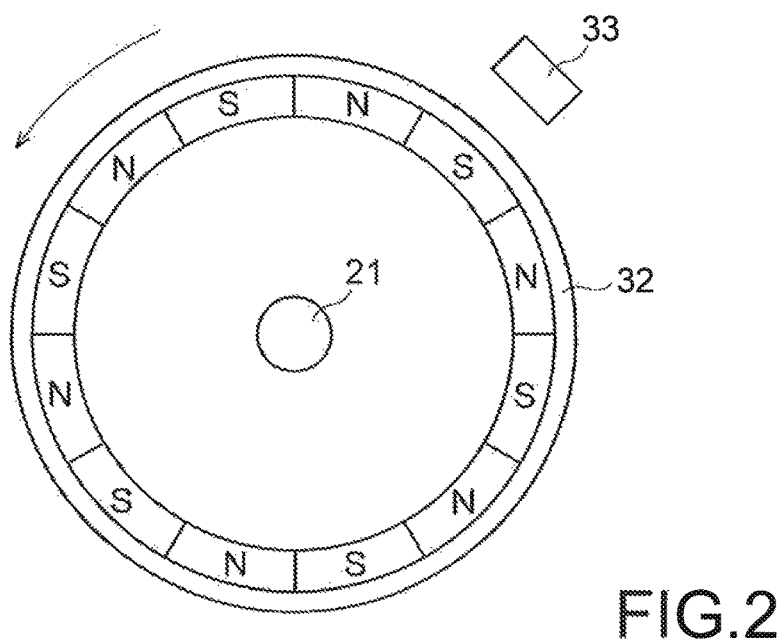
FIG. 2 is a diagram showing a schematic configuration of a motor generator 3 of the hybrid vehicle 30.
Figure 3:
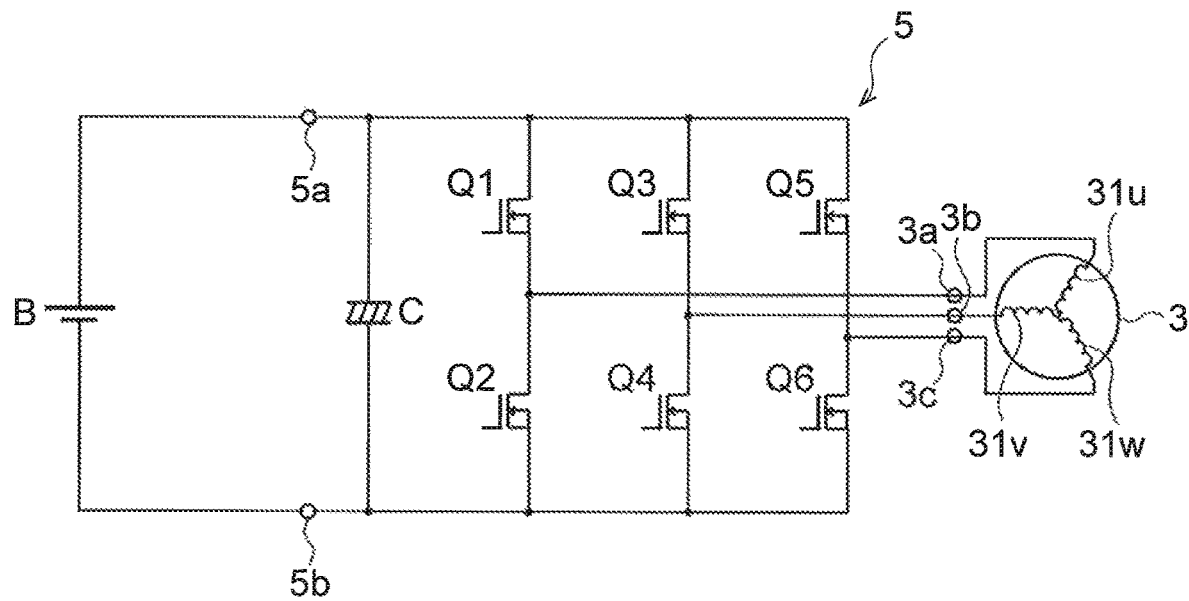
FIG. 3 is a diagram showing a schematic configuration of a power converting circuit 5 of the hybrid vehicle 30.

As shown in FIGS. 2 and 3, the motor generator 3 includes: stator coils 31$u$, 31$v$, and 31$w$ attached to a crankcase (not shown) of the internal combustion engine 2; a flywheel (magnet rotor) 32 attached to an end portion of the crankshaft 21 of the internal combustion engine 2; and a position detecting unit 33 provided on the flywheel 32. Note that the stator coils 31$u$, 31$v$, and 31$w$ are not illustrated in FIG. 2. Furthermore, the arrangement position of the position detecting unit 33 is not limited to the position shown in FIG. 2.

As shown in FIG. 2, magnets of an N pole and magnets of an S pole are alternatively attached to the inside of the flywheel 32. In the present embodiment, a total of twelve magnets are attached at 30° intervals. Note that the number of magnets is not limited to twelve. The position detecting unit 33 transmits a pulse signal to the controlling apparatus 1 every time the flywheel 32 rotates 30°. The position detecting unit 33 is, for example, a Hall element. The Hall element is preferably provided for each phase of a U phase, a V phase, and a W phase. The pulse signal detected by the Hall element is transmitted to the controlling apparatus 1.

The controlling apparatus 1 calculates a rotational speed of the motor generator 3 (flywheel 32) based on the pulse signal received from the position detecting unit 33. A relatively large number of magnets can be provided on the flywheel 32 with a larger diameter than the crankshaft 21. Therefore, the controlling apparatus 1 can use the signal of the position detecting unit 33 to calculate the rotational speed at a higher resolution than a conventional engine rotational speed. Since the flywheel 32 is connected to the crankshaft 21 all the time, the rotational speed of the flywheel 32 (motor generator 3) is always the same as the rotational speed of the crankshaft 21 (internal combustion engine 2). Therefore, the rotational speed of the motor generator 3 calculated by using the position detecting unit 33 can be used as the rotational speed of the internal combustion engine 2.

As the flywheel 32 of the motor generator 3 rotates in synchronization with the crankshaft 21 of the internal combustion engine 2, alternating current power of three phases is output from the stator coils 31u, 31v, and 31w. On the other hand, by applying three-phase alternating current to the stator coils 31u, 31v, and 31w, torque is provided to the internal combustion engine 2 through the flywheel 32.

As described above, the motor generator 3 is configured to be capable of generating power in response to the rotation of the internal combustion engine 2 and capable of providing torque to the internal combustion engine 2. More specifically, when the motor generator 3 is rotated and driven by the internal combustion engine 2, the motor generator 3 generates power and outputs three-phase alternating current power to the power converting circuit 5. Then, the power converting circuit 5 converts the three-phase alternating current power to direct current power to charge a battery B (direct current power supply) included in the battery apparatus 6. On the other hand, when torque is to be provided to the internal combustion engine 2, the motor generator 3 rotates based on the three-phase alternating current power output from the power converting circuit 5 to assist the internal combustion engine 2.

Note that the motor generator 3 may also function as a starting motor (self-starter) that causes the internal combustion engine 2 to start to rotate when the hybrid vehicle 30 departs.

The ignition apparatus 4 receives a control signal from the controlling apparatus 1 and ignites, at an appropriate timing, the air-fuel mixture compressed in the cylinder of the internal combustion engine 2. Note that the kind of the ignition apparatus 4 is not particularly limited, and the ignition apparatus 4 may be a CDI (Capacitive Discharge Ignition) type or a full transistor type.

When the motor generator 3 assists the internal combustion engine 2, the power converting circuit 5 converts the direct current power output from the battery B of the battery apparatus 6 into alternating current power of three phases and supplies the alternating current power of three phases to the motor generator 3 to drive the motor generator 3. On the other hand, when the motor generator 3 generates power, the power converting circuit 5 converts the three-phase alternating current power supplied from the motor generator 3 into direct current power and outputs the direct current power to the battery B of the battery apparatus 6.

As shown in FIG. 3, the power converting circuit 5 includes a three-phase full-bridge circuit. Semiconductor switches Q1, Q3, and Q5 are high side switches, and semiconductor switches Q2, Q4, and Q6 are low side switches. Control terminals of the semiconductor switches Q1 to Q6 are electrically connected to the controlling apparatus 1. Note that the semiconductor switches Q1 to Q6 are, for example, MOSFETs, IGBTs, or the like. A smoothing capacitor C is provided between a power supply terminal 5a and a power supply terminal 5b.

The semiconductor switch Q1 is connected between the power supply terminal 5a, to which a positive electrode of the battery B is connected, and a terminal 3a of the motor generator 3. Similarly, the semiconductor switch Q3 is connected between the power supply terminal 5a, to which the positive electrode of the battery B is connected, and a terminal 3b of the motor generator 3. The semiconductor switch Q5 is connected between the power supply terminal 5a, to which the positive electrode of the battery B is connected, and a terminal 3c of the motor generator 3.

The semiconductor switch Q2 is connected between the power supply terminal 5b, to which a negative electrode of the battery B is connected, and the terminal 3a of the motor generator 3. Similarly, the semiconductor switch Q4 is connected between the power supply terminal 5b, to which the negative electrode of the battery B is connected, and the terminal 3b of the motor generator 3. The semiconductor switch Q6 is connected between the power supply terminal 5b, to which the negative electrode of the battery B is connected, and the terminal 3c of the motor generator 3. Note that the terminal 3a is a terminal of the U phase, the terminal 3b is a terminal of the V phase, and the terminal 3c is a terminal of the W phase.

The battery apparatus 6 includes the chargeable and dischargeable battery B and a battery managing unit (Battery Management Unit: BMU) (not shown) that manages the battery B. The battery B can accumulate power generated by the motor generator 3 and can supply the power to the motor generator 3. The type of the battery B is not particularly limited, and for example, the battery B is a lithium ion battery. The battery managing unit transmits information (battery information) related to the voltage of the battery B and the state of the battery B to the controlling apparatus 1.

The storing apparatus 7 stores information used by the controlling apparatus 1 (such as various maps and operation programs for controlling the internal combustion engine 2 and the motor generator 3). The storing apparatus 7 is constituted by, for example, a non-volatile semiconductor memory.

Next, details of the controlling apparatus 1 will be described with reference to FIG. 4.

Figure 4:
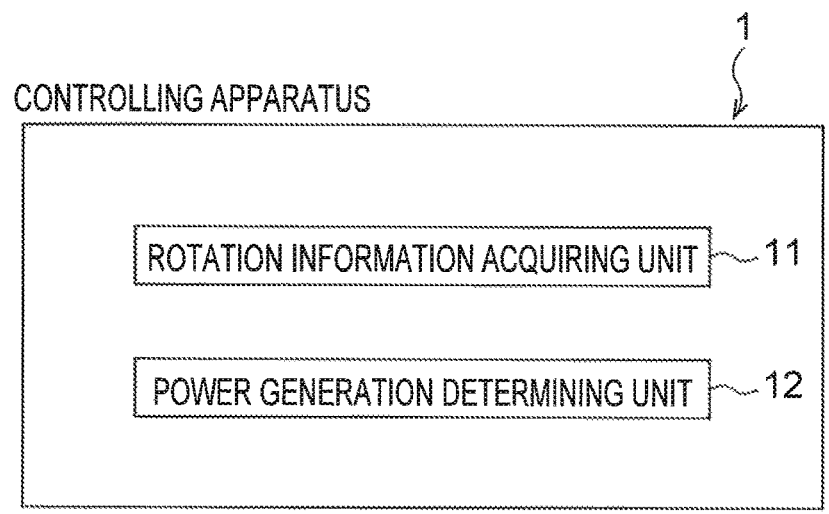
FIG. 4 is a functional block diagram of the controlling apparatus 1 according to the embodiment.

The controlling apparatus 1 includes a rotation information acquiring unit 11 and a power generation determining unit 12 as shown in FIG. 4.

The rotation information acquiring unit 11 acquires rotation information of the motor generator 3 with a higher resolution than rotation information of the internal combustion engine 2. Here, the "rotation information" is the rotational speed or the number of rotations. In the present embodiment, the rotation information acquiring unit 11 acquires the rotational speed of the motor generator 3 calculated based on the pulse signal received from the position detecting unit 33. Note that the rotation information acquiring unit 11 itself may calculate the rotational speed of the motor generator 3 based on the pulse signal of the position detecting unit 33. Since the flywheel 32 is mechanically connected to the crankshaft 21 as described above, the rotational speed of the motor generator 3 (flywheel 32) acquired by the rotation information acquiring unit 11 is equal to the rotational speed of the internal combustion engine 2 (crankshaft 21).

The power generation determining unit 12 makes a determination regarding the power generation by the motor generator 3 based on the rotation information of the motor generator 3. The power generation determining unit 12 sequentially makes a determination regarding the idle power generation and makes a determination regarding the cruise power generation. For example, the power generation determining unit 12 makes a determination regarding the idle power generation and then makes a determination regarding the cruise power generation. Since the power generation determining unit 12 makes the determination regarding the power generation based on the rotational speed of the motor generator 3 with a higher resolution than the rotational speed (engine rotational speed) of the internal combustion engine 2, the power generation determining unit 12 can promptly make the determination regarding the power generation.

Next, details of the determination regarding the power generation by the power generation determining unit 12 will be described. Note that an example of a determination flow will be described later with reference to FIGS. 6 and 7.

When starting of the internal combustion engine 2 is completed, and a starting completion reference time has passed, the power generation determining unit 12 permits the idle power generation by the motor generator 3. As for the judgement of the completion of starting of the internal combustion engine 2, the power generation determining unit 12 judges that the starting of the internal combustion engine 2 is completed when the rotational speed of the motor generator 3 is equal to or greater than a prescribed threshold (internal combustion engine starting completion rotational speed).

Note that the power generation determining unit 12 cancels the permission of the idle power generation when the motor generator 3 is in an abnormal state or when brake control is performed. This can prevent execution of the idle power generation under a situation of a malfunction of the motor generator 3 or a brake operation. The "brake control" here denotes causing the motor generator 3 (for example, motor generator based on alternating current generator ACG) to generate negative motor torque to apply the brake or putting the motor generator 3 into a short circuit state to apply the brake. The "short circuit state" denotes a state in which one of the high side switches (semiconductor switches Q1, Q3, and Q5) and the low side switches (semiconductor switches Q2, Q4, and Q6) is turned on, and the other is turned off.

When the starting of the internal combustion engine 2 is not completed, and the rotational speed of the motor generator 3 is equal to or greater than a prescribed threshold (power generation possible reference rotational speed), the power generation determining unit 12 accepts the idle power generation by the motor generator 3. Note that the power generation possible reference rotational speed is a minimum rotational speed at which the motor generator 3 can generate power. The power generation possible reference rotational speed is smaller than the internal combustion engine starting completion rotational speed. When the idle power generation is accepted, once the starting of the internal combustion engine 2 is completed, the idle power generation is permitted after the starting completion reference time has passed.

The power generation determining unit 12 permits the cruise power generation by the motor generator 3 when the rotational speed of the motor generator 3 is equal to or greater than a high rotation reference rotational speed. Note that the power generation determining unit 12 cancels the permission of the cruise power generation when the motor generator 3 is in an abnormal state or when brake control is performed. This can prevent execution of the cruise power generation under a situation of a malfunction of the motor generator 3 or a brake operation.

When the cruise power generation is currently performed, the power generation determining unit 12 continues the cruise power generation without stopping the cruise power generation even if the rotational speed of the motor generator 3 is smaller than the high rotation reference rotational speed as long as the rotational speed of the motor generator 3 is equal to or greater than a second high rotation reference rotational speed lower than the high rotation reference rotational speed. This can prevent frequent occurrence of transition between an execution state and a non-execution state of the cruise power generation.

As described, in the controlling apparatus 1 according to the present embodiment, the rotation information of the motor generator 3 (flywheel 32) with a higher resolution than the rotation information of the internal combustion engine 2 (crankshaft 21) is acquired, and the determination regarding the power generation (idle power generation and cruise power generation) is made based on the rotation information. By using the rotation information with a high resolution, the rotational speed of the internal combustion engine 2 can be quickly confirmed to make the determination regarding the power generation. Therefore, according to the present embodiment, the determination regarding the power generation of the hybrid vehicle 30 can be promptly made.

Figure 5:
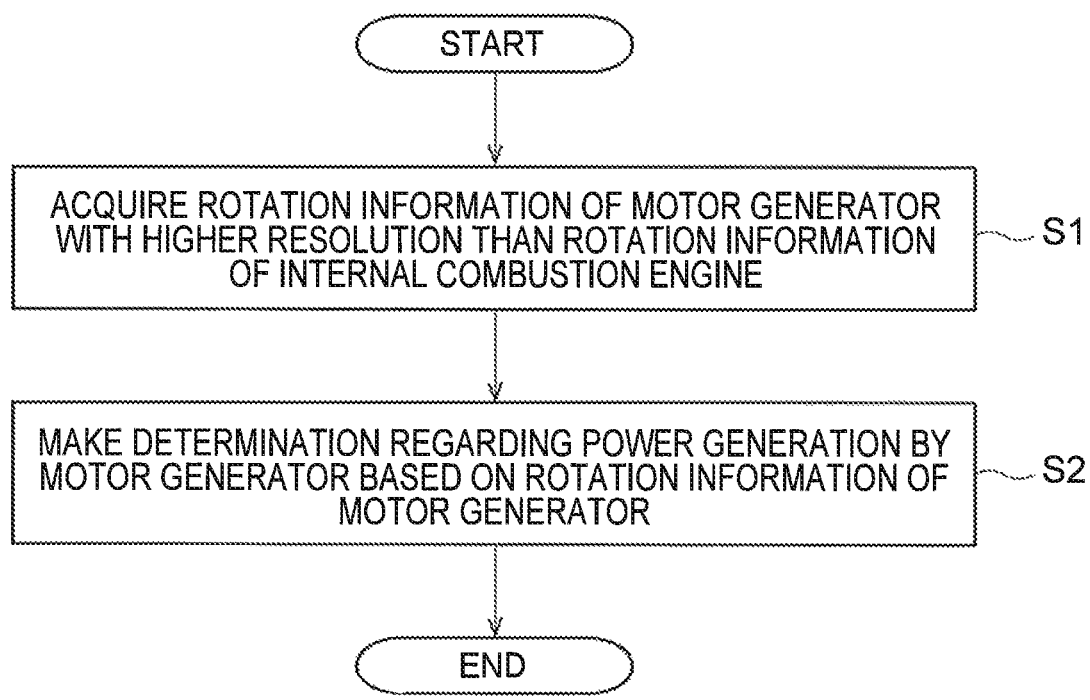
FIG. 5 is a flow chart showing a controlling method according to the embodiment.
Figure 6:
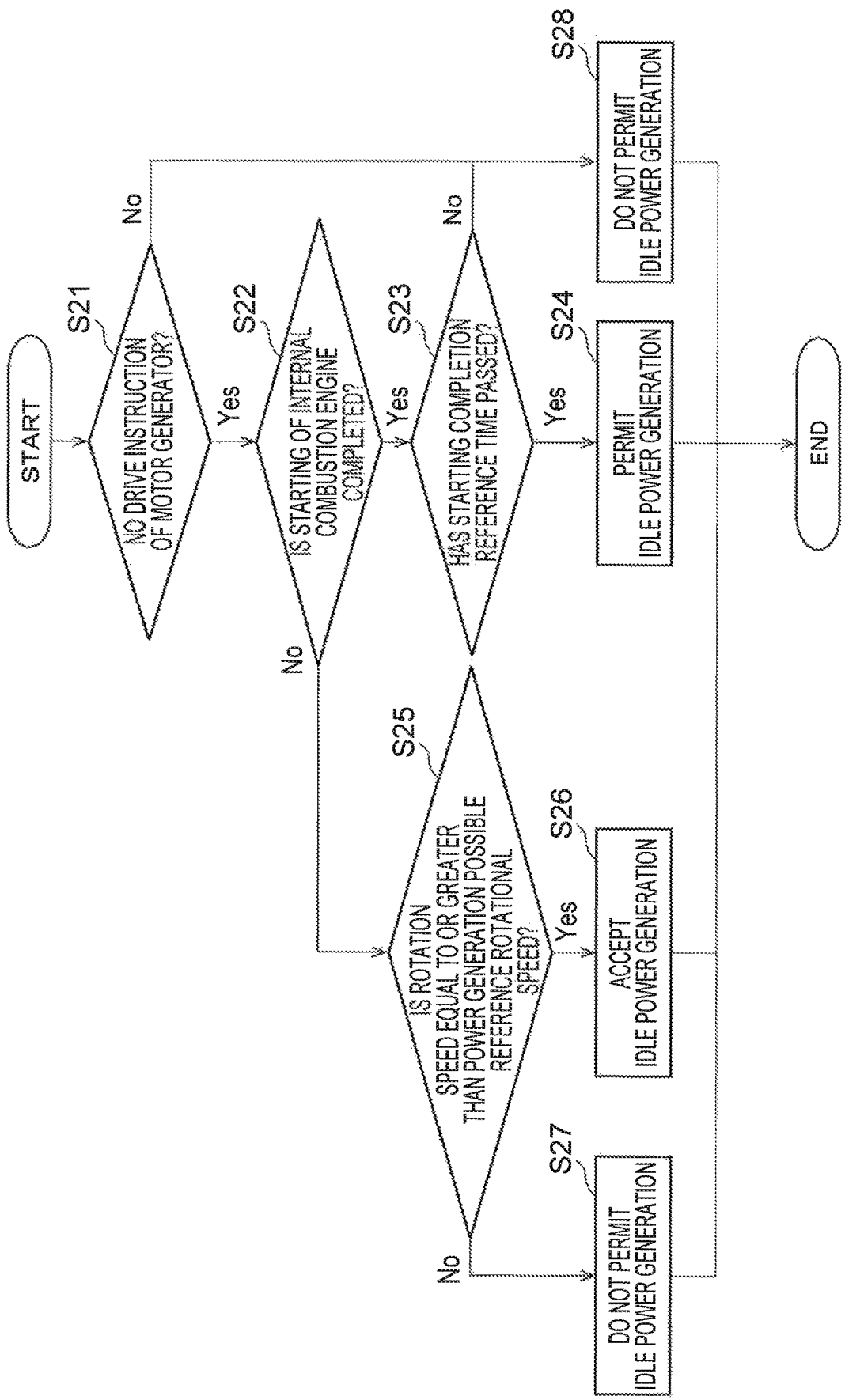
FIG. 6 is a flow chart showing an example of a determining method regarding idle power generation.
Figure 7:
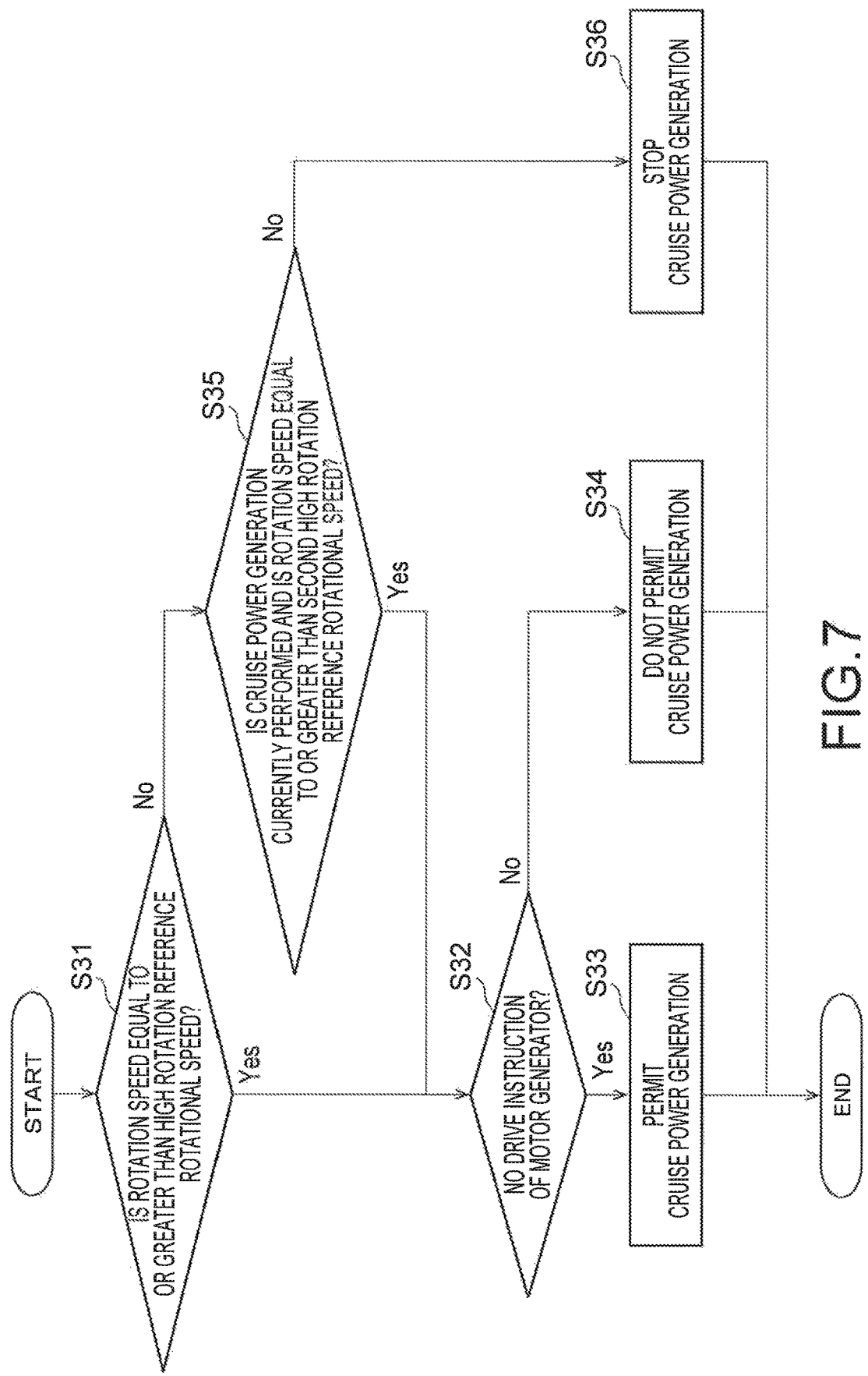
FIG. 7 is a flow chart showing an example of a determining method regarding cruise power generation.

Next, a controlling method of the hybrid vehicle 30 according to the present embodiment will be described with reference to flow charts of FIGS. 5 to 7.

First, the rotation information acquiring unit 11 acquires the rotation information of the motor generator 3 (flywheel 32) with a higher resolution than the rotation information of the internal combustion engine 2 (crankshaft 21) (step S1).

After the rotation information of the motor generator 3 is acquired, the power generation determining unit 12 makes a determination regarding the power generation by the motor generator 3 based on the rotation information (step S2). In the present embodiment, the determination regarding the idle power generation is made along the flow chart of FIG. 6, and the determination regarding the cruise power generation is made along the flow chart of FIG. 7. The flow charts of FIGS. 6 and 7 are sequentially executed. More specifically, the determination flow regarding the idle power generation illustrated in FIG. 6 is executed, and then the determination flow regarding the cruise power generation illustrated in FIG. 7 is executed.

First, the determination flow regarding the idle power generation will be described with reference to FIG. 6.

The power generation determining unit 12 judges whether there is a drive instruction of the motor generator 3 (step S21). If there is no drive instruction (S21; Yes), the power generation determining unit 12 proceeds to step S22. On the other hand, if there is a drive instruction (S21; No), the power generation determining unit 12 prioritizes the drive instruction and does not permit the idle power generation (step S28).

If there is no drive instruction of the motor generator 3, the power generation determining unit 12 judges whether starting of the internal combustion engine 2 is completed (step S22). Specifically, when the rotational speed indicated by the rotation information acquired in step S1 is equal to or greater than the prescribed threshold (internal combustion engine starting completion rotational speed), the power generation determining unit 12 judges that the starting of the internal combustion engine 2 is completed. If the starting is completed (S22; Yes), the power generation determining unit 12 proceeds to step S23. On the other hand, if the starting is not completed (S22; No), the power generation determining unit 12 proceeds to step S25.

If the starting of the internal combustion engine 2 is completed (S22; Yes), the power generation determining unit 12 judges whether the starting completion reference time has passed (step S23). If the starting completion reference time has passed (S23; Yes), the power generation determining unit 12 permits the idle power generation (step S24). When the idle power generation is permitted, the idle power generation is executed as long as there is no prohibition factor, such as an abnormality of the motor generator 3 and brake control. On the other hand, if the starting completion reference time has not passed (S23; No), the power generation determining unit 12 does not permit the idle power generation (step S28).

If the starting of the internal combustion engine 2 is not completed (S22; No), the power generation determining unit 12 judges whether the rotational speed of the motor generator 3 is equal to or greater than the power generation possible reference rotational speed (step S25). If the rotational speed is equal to or greater than the power generation possible reference rotational speed (S25; Yes), the power generation determining unit 12 accepts the idle power generation (step S26). Once the idle power generation is accepted, the idle power generation is executed as long as there is no prohibition factor when the rotational speed becomes equal to or greater than the power generation possible reference rotational speed.

On the other hand, if the rotational speed is smaller than the power generation possible reference rotational speed (S25; No), the power generation determining unit 12 does not permit the idle power generation (step S27).

Next, the determination flow regarding the cruise power generation will be described with reference to FIG. 7.

The power generation determining unit 12 determines whether the rotational speed of the motor generator 3 is equal to or greater than the high rotation reference rotational speed (step S31). If the rotational speed is equal to or greater than the high rotation reference rotational speed (S31; Yes), the power generation determining unit 12 proceeds to step S32. On the other hand, if the rotational speed is smaller than the high rotation reference rotational speed (S31; No), the power generation determining unit 12 proceeds to step S35.

If the rotational speed of the motor generator 3 is equal to or greater than the high rotation reference rotational speed (S31; Yes), the power generation determining unit 12 judges whether there is a drive instruction of the motor generator 3 (step S32). If there is no drive instruction (S32; Yes), the power generation determining unit 12 permits the cruise power generation (step S33). On the other hand, if there is a drive instruction (S32; No), the power generation determining unit 12 prioritizes the drive instruction and does not permit the cruise power generation (step S34).

If the rotational speed of the motor generator 3 is smaller than the high rotation reference rotational speed (S31; No), the power generation determining unit 12 judges whether the cruise power generation is currently performed and the rotational speed of the motor generator 3 is equal to or greater than the second high rotation reference rotational speed smaller than the high rotation reference rotational speed (step S35). If the rotational speed is equal to or greater than the second high rotation reference rotational speed (S35; Yes), the power generation determining unit 12 proceeds to step S32. On the other hand, if the rotational speed is smaller than the second high rotation reference rotational speed (S35; No), the power generation determining unit 12 stops the cruise power generation (step S36).

As described above, in the controlling method according to the present embodiment, the rotation information of the motor generator 3 with a higher resolution than the rotation information (engine rotational speed) of the internal combustion engine 2 is acquired, and the acquired rotational speed of the motor generator 3 is used in the judgement of the determination flow of the idle power generation and the determination flow of the cruise power generation. In this way, the judgement in steps S22 and S25 of the idle power generation determination flow and steps S31 and S35 of the cruise power generation determination flow can be promptly made, and as a result, the determination regarding the power generation of the hybrid vehicle 30 can be promptly made.

Although those skilled in the art may be able to conceive additional advantageous effects and various modifications of the present invention based on the description above, modes of the present invention are not limited to the individual embodiments. Constituent elements across different embodiments may be appropriately combined. Various additions, changes, and partial deletions are possible without departing from the conceptual spirit and scope of the present invention derived from the content provided in the claims and equivalents of the content.

Reference Signs List

1 controlling apparatus
2 internal combustion engine (engine)
21 crankshaft
3 motor generator
3a, 3b, 3c terminals
4 ignition apparatus
5 power converting circuit
5a, 5b power supply terminals
6 battery apparatus
7 storing apparatus
8 clutch
9 wheel
11 rotation information acquiring unit
12 power generation determining unit
30 hybrid vehicle
31u, 31v, 31w stator coils
32 flywheel
33 position detecting unit
B battery
C smoothing capacitor
Q1 to Q6 semiconductor switches

The invention claimed is:

1. A controlling apparatus of a hybrid vehicle comprising a motor generator that is mechanically connected to an internal combustion engine and that can generate power in response to rotation of the internal combustion engine and provide torque to the internal combustion engine, the controlling apparatus comprising:
 a rotation information acquiring unit that acquires rotation information of the motor generator with a higher resolution than rotation information of the internal combustion engine; and
 a power generation determining unit that makes a determination regarding the power generation by the motor generator based on the rotation information of the motor generator, wherein the power generation determining unit permits idle power generation by the motor generator when starting of the internal combustion engine is completed and a starting completion reference time has passed, wherein the power generation determining unit accepts or does not permit the idle power generation by the motor generator, based on a result of comparing a rotational speed of the motor generator and a power generation possible reference rotational speed.

2. The controlling apparatus according to claim 1, wherein
the power generation determining unit cancels the permission of the idle power generation when the motor generator is in an abnormal state or when brake control is performed.

3. The controlling apparatus according to claim 1, wherein
the power generation determining unit accepts the idle power generation by the motor generator when the starting of the internal combustion engine is not completed and a rotational speed of the motor generator is equal to or greater than a power generation possible reference rotational speed.

4. The controlling apparatus according to claim 1, wherein
the power generation determining unit does not permit the idle power generation by the motor generator when the starting of the internal combustion engine is not completed and the rotational speed of the motor generator is smaller than a power generation possible reference rotational speed.

5. The controlling apparatus according to claim 1, wherein
the power generation determining unit permits cruise power generation by the motor generator when the rotational speed of the motor generator is equal to or greater than a high rotation reference rotational speed.

6. The controlling apparatus according to claim 5, wherein
the power generation determining unit cancels the permission of the cruise power generation when the motor generator is in an abnormal state or when brake control is performed.

7. The controlling apparatus according to claim 5, wherein
when the cruise power generation is currently performed, the power generation determining unit continues the cruise power generation even if the rotational speed of the motor generator is smaller than the high rotation reference rotational speed as long as the rotational speed of the motor generator is equal to or greater than a second high rotation reference rotational speed lower than the high rotation reference rotational speed.

8. The controlling apparatus according to claim 1, wherein
the motor generator causes the internal combustion engine to start to rotate when the hybrid vehicle departs.

9. The controlling apparatus according to claim 1, wherein
the hybrid vehicle is a hybrid two-wheeled vehicle.

10. A controlling method of a hybrid vehicle comprising a motor generator that is mechanically connected to an internal combustion engine and that can generate power in response to rotation of the internal combustion engine and provide torque to the internal combustion engine, the controlling method comprising:
acquiring, by a rotation information acquiring unit, rotation information of the motor generator with a higher resolution than rotation information of the internal combustion engine; and
making a determination, by a power generation determining unit, regarding the power generation by the motor generator based on the rotation information of the motor generator, wherein the power generation determining unit permits idle power generation by the motor generator when starting of the internal combustion engine is completed and a starting completion reference time has passed,
wherein the power generation determining unit accepts or does not permit the idle power generation by the motor generator, based on a result of comparing a rotational speed of the motor generator and a power generation possible reference rotational speed.

* * * * *